July 3, 1956 A. C. GROHSGAL 2,753,443
PORTABLE LANTERN
Filed March 10, 1955 3 Sheets-Sheet 1

Alexis C. Grohsgal INVENTOR

BY *CA Snow & Co.*

ATTORNEYS.

July 3, 1956
A. C. GROHSGAL
2,753,443
PORTABLE LANTERN
Filed March 10, 1955
3 Sheets-Sheet 2
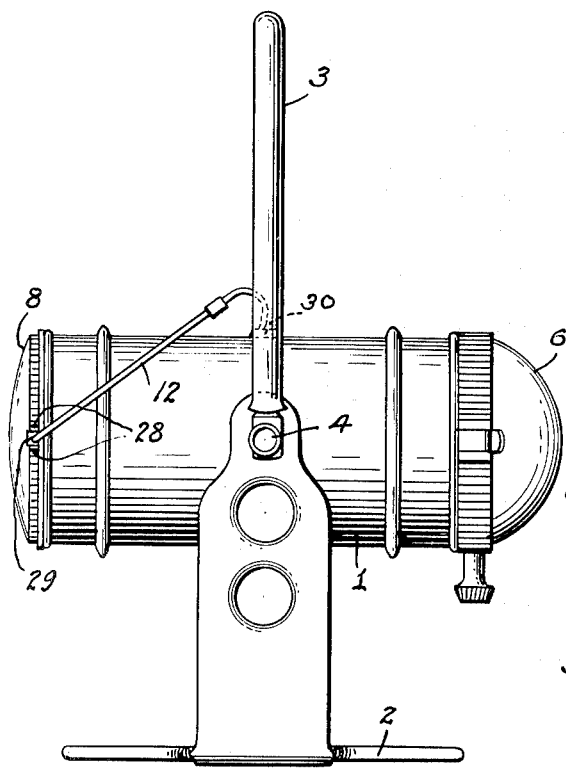
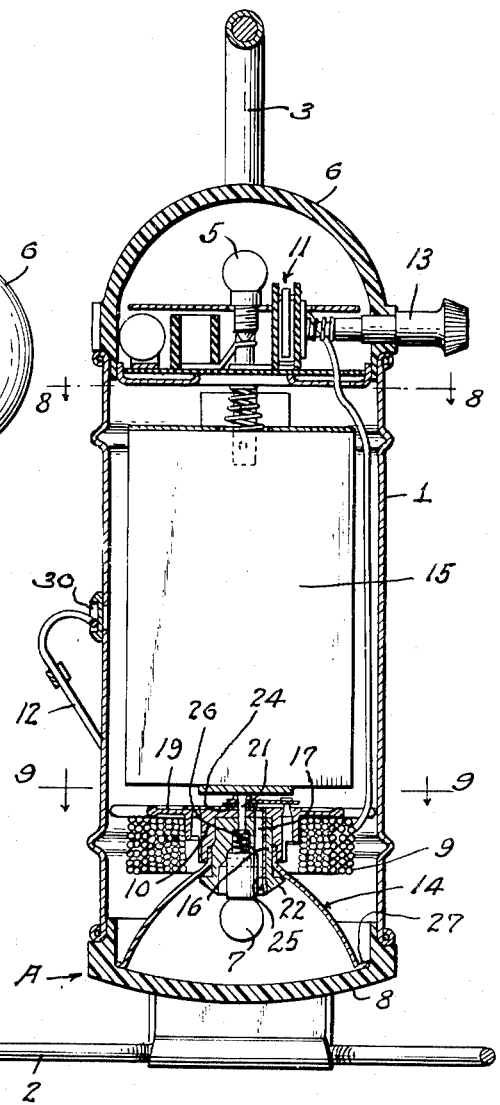
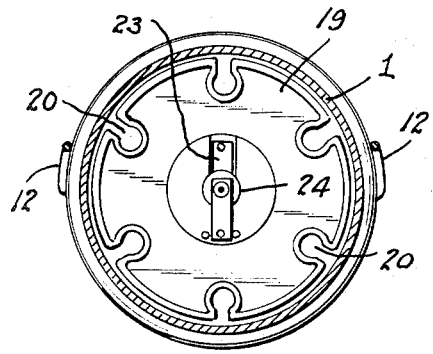
Alexis C. Grohsgal
INVENTOR
BY CASnow&Co.
ATTORNEYS.

July 3, 1956  A. C. GROHSGAL  2,753,443
PORTABLE LANTERN
Filed March 10, 1955  3 Sheets-Sheet 3
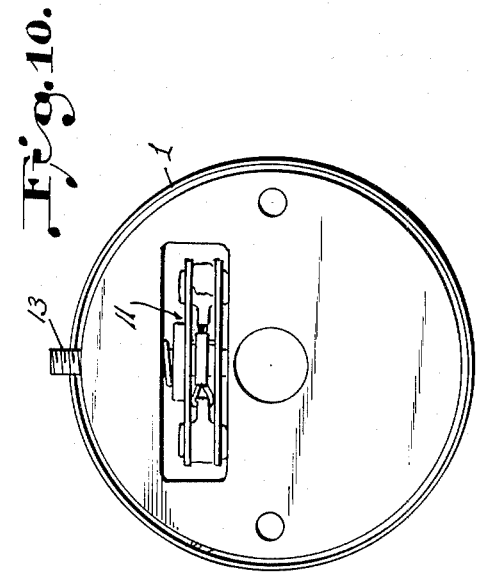
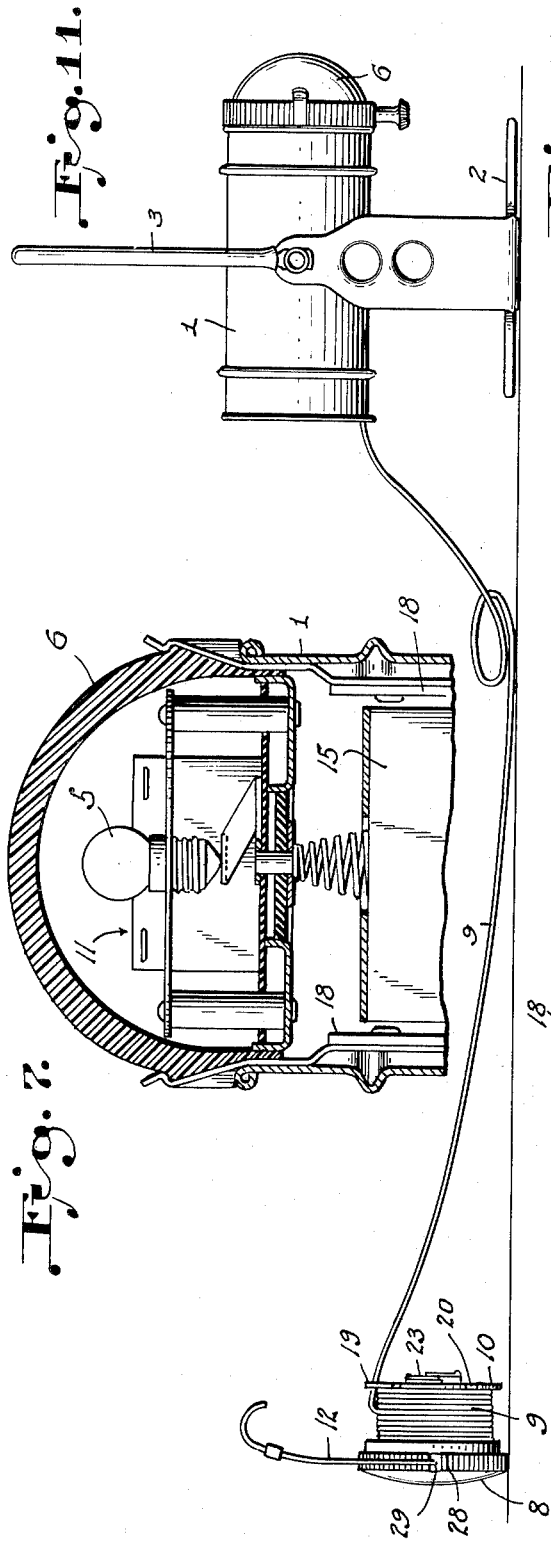
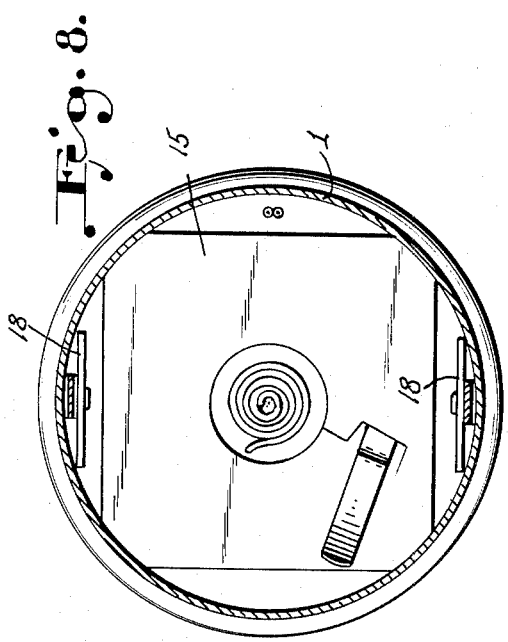
Alexis C. Grohsgal
INVENTOR
BY C A Snow & Co.
ATTORNEYS.

United States Patent Office 2,753,443
Patented July 3, 1956

2,753,443

PORTABLE LANTERN

Alexis C. Grohsgal, Cranston, R. I., assignor to Cable Electric Products, Inc., Providence, R. I.

Application March 10, 1955, Serial No. 493,324

1 Claim. (Cl. 240—10.63)

This invention relates to portable lanterns of general utility and particularly to those lighted with electric power, supplied by a self-contained battery.

The primary object of this invention is to provide a portable utility lantern having a warning light and a built-in extension light of improved design for use in locations remote from the source of electric power.

A further object is the provision of an improved design for the extension light, fixedly attached to a cord reel to receive the extension cord and held together as a unit by a single eyelet.

A further object is the provision of means for mounting, detaching and using the extension light, of an improved design, which is simple, efficient, reliable and of low cost.

A further object of the invention is the construction of the bulb holder of improved design which resiliently retains the bulb and completes the electric circuit in a simple, durable, efficient manner.

A further object is the provision of means for retaining the lens on the extension light reflector which also resiliently retains the extension light unit in and attached to the lantern housing, and acts to support the light, when the unit is detached, at various angles to suit the needs of the operator.

Other objects of the invention will become apparent from the following detailed description of the invention as embodied in the drawings briefly described below, in which:

In the drawings:

Fig. 5 is a side elevation of the device in carrying position with the lantern housing turned horizontally on its pivot mounting;

Fig. 6 is a sectional side elevation of the device seen in Fig. 2 along section line 6—6 of Fig. 1;

Fig. 7 is an enlarged sectional front elevation of the upper end of the device seen in Fig. 1 along a center section line of Fig. 2;

Fig. 8 is an enlarged sectional plan view along line 8—8 of Fig. 6 showing the upper end of the battery mounted in the lantern housing;

Fig. 9 is a plan view in section along line 9—9 of Fig. 6 of the extension light unit mounted in the lantern housing and showing the base of the reel flange;

Fig. 10 is an enlarged plan view of the red blinker light assembly without lamp; and Fig. 11 is a side elevation similar to Fig. 5 with the extension light unit detached ready for use.

Figure 1:
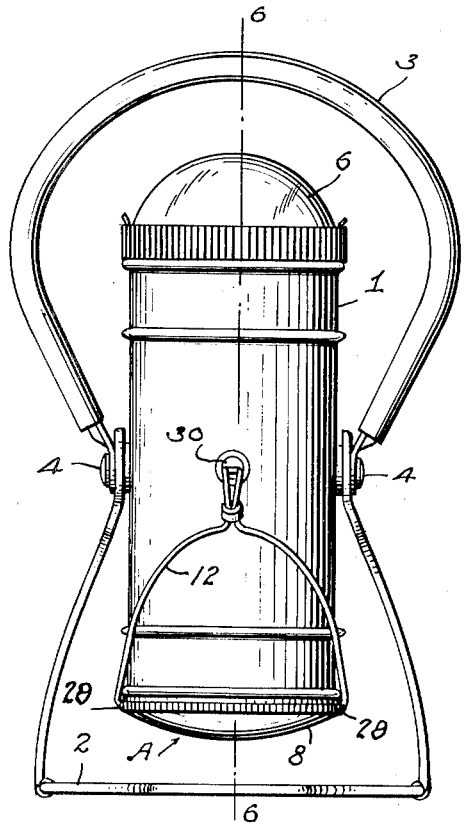
Fig. 1 is a front elevation of my portable lantern in carrying position.

In the drawings, which show the preferred embodiment om my invention, portable lantern, the lantern housing 1 is pivotally mounted with lateral pivot pins 4 extending through the two ends of upwardly extending supports attached to a base 2. The two ends of a curved metallic handle 3 suitably covered are also pivotally mounted on the pivot pins. Both mountings are sufficiently tight to resist angular change of position of the lantern housing, although it is free to be moved through 360° about the pivot points.

In the upper end of the lantern as seen in Figs. 1 and 6, there is a warning lamp unit consisting of an assembled frame structure carrying the lamp 5 in circuit, two spare bulbs in the frame and a 4-way switch 11. A red plastic translucent lens 6 with a cylindrical flange fits over the warning lamp unit and is attached to it by the screw handle 13 to switch 11, which passes through a hole in the flange as seen. The lamp unit and attached lens are mounted in the end of the lantern housing and detachably retained therein by means of opposed spring fingers, shaped as shown in Fig. 7 and seated in corresponding slots in the lens flange, in a well known manner. When the lamp unit is seated, the battery circuit is completed through battery spring contacts seen in Fig. 7. The battery unit 15 is of 6 volt supply and is supported on a U-shaped frame 18, seen in Figs. 7 and 8, which is attached to the lantern housing.

In the other end of the lantern, as seen in Figs. 1 and 6, there is an extension light unit A, comprising a lamp 7, reflector 14, lens 8, extension cord 9, cord reel 10 and resilient bowed retaining and supporting hook member 12.

The 4-way switch 11 operates both lamps wired in parallel across the terminals of battery unit 15. The handle 13 is rotated to light either lamp bulb singly or together. The circuit to the warning lamp 5 gives a flashing light.

In the extension light unit, the metallic reflector 14 preferably of aluminum has a polished inner surface and reduced center extension with cylindrical end. The lamp socket member 16 has a lateral flange 22 and stepped reduced end and a longitudinal slot 17 along one side. It is of suitable insulating material, as fibre or plastic, such as a phenolic condensation product. The cord reel 10 is of fibre or plastic, such as styrene or other suitable insulating material. The reel is cylindrical and has a longitudinal recess to receive the reduced end of the socket member and reflector's cylindrical end flange. The cord reel has a lateral base flange 19 with peripheral slots 20, inwardly enlarged as seen in Fig. 9. The reel has oppositely disposed longitudinal holes through it and its flange to accommodate the circuit wire ends.

In assembling this unit the socket member 16 is snugly seated within the reflector 14 with reduced end projecting. This end is pressed into the reel recess and seated therein. A single eyelet 21 is used to hold the reflector, socket member and reel together. This passes through the reel base and into the inner end of the socket member's recess. The outer end of the eyelet holds in position two lugs, attached to the wire ends. These are of conductive metal and separated by a fibre washer 24. One lug 23 surrounds the eyelet and is spaced therefrom. It is of resilient metal, such as spring brass and extends into slot 17, where it terminates in a spring finger 25 to engage a flange on the lamp bulb and hold it in position. A small spiral spring 26 seated in the eyelet passage and contacting the eyelet completes the circuit and presses the lamp bulb outwardly to engage its flange with the spring finger. This gives good contacts and a resilient seating for the lamp bulb.

Figure 4:
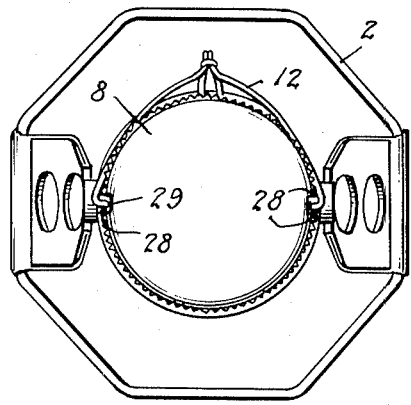
Fig. 4 is a bottom plan view of Fig. 1.

The outer enlarged end of the reflector 14 has a flat lateral circular flange 27. Over this fits the lens 8 of clear translucent plastic having a cylindrical flange on its edge. This flange is longitudinally serrated externally for half its length. The remainder forms a smooth rim and has a series of oppositely disposed outwardly projecting knobs 28. Between these knobs in the serrated section, there are two oppositely disposed slots with a hole 29 in each extending through the section. The lens 8 is retained in position over the reflector by means of the bowed resilient hook member 12 as seen in Figs. 4 and 5. After the lens is in place, the member 12 has its ends, which are turned toward each other, spread sufficiently to be placed in the holes 29 in the lens flange. These ends then snap to seating position under the flat flange 27 of the reflector.

Figure 2:
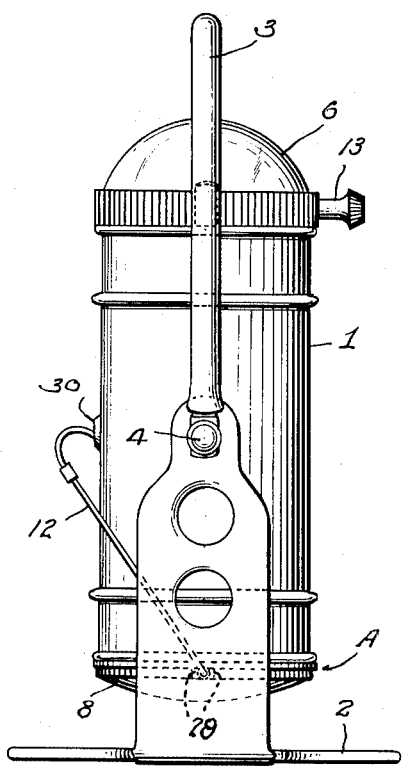
Fig. 2 is a side elevation thereof.
Figure 3:
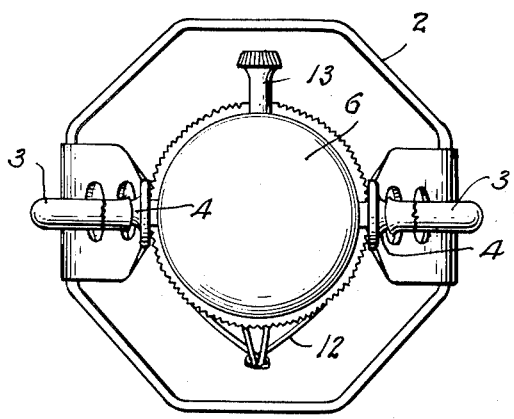
Fig. 3 is a plan view of Fig. 1 with part of the carrying handle broken away.

To house the extension light unit A the 25 foot length of extension cord 9 is wound on the reel 10 and through one slot 20. It is then seated in the lantern housing and the member 12 swung past the knobs 28, to the position seen in Fig. 2, where the hooked center part of member 12, with pressure, will snap into the indented socket 30 of the lantern housing wall. Thus, the extension light unit is resiliently retained snugly in position without rattle.

In use the hook member 12 is released by merely pulling it laterally away from the lantern housing. The cord is then unreeled and the hook member is turned to the desired angle across the knobs 28, and either placed on a flat support or suspended by the hook 12 from above. When the necessary cord is led out, it can then be inserted in a slot 20 to avoid tangling.

Thus, it is seen that the extension light can be used as a movable flashlight, as an angled spotlight or for general illumination, separate and apart from the warning light or in cooperation with it.

The structure illustrated and described above, constitutes the preferred embodiment of my invention, as defined by the claim enumerated below.

I claim:

An electric utility lantern comprising a base, a pair of upwardly and inwardly directed supporting arms rising from said base, a cylindrical housing, means pivotally securing said housing to said arms, a bail secured to said pivot means, a dome-shaped lens secured to one end of said housing, a light socket interiorly of said lens, a battery in said housing, a light circuit in said housing, said socket being interposed in said circuit, a multiple switch interposed in said circuit, a second lens disposed at the other end of said housing, an annular flange carried by said second lens engaging within said other end of said housing, a reflector fixed in said annular flange, a spool carried by the inner end of said reflector, a light socket centrally of said reflector and interposed in said circuit, a conductor about said spool connected at one end to said latter named socket and connected at the other end to said switch, a pair of outwardly divergent bowed wires pivotally secured to said lens, a hook at the convergent ends of said wires, and a keeper carried by said housing engageable by said hook for holding said second lens in said housing.

References Cited in the file of this patent

UNITED STATES PATENTS

| | | |
|---|---|---|
| 1,330,974 | Bauman | Feb. 17, 1920 |
| 1,392,441 | Nikonow | Oct. 4, 1921 |
| 1,719,050 | Freeman | July 2, 1929 |
| 2,053,591 | Wiley | Sept. 8, 1936 |
| 2,303,086 | Muldoon | Nov. 24, 1942 |
| 2,481,444 | Pierrez | Sept. 6, 1949 |